United States Patent
Muley et al.

(10) Patent No.: US 8,755,266 B2
(45) Date of Patent: Jun. 17, 2014

(54) DUPLICATE TRAFFIC AVOIDANCE IN A POINT TO MULTI-POINT NETWORK

(75) Inventors: Praveen V. Muley, Mountain View, CA (US); Pradeep G. Jain, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 665 days.

(21) Appl. No.: 12/656,448

(22) Filed: Jan. 29, 2010

(65) Prior Publication Data

US 2011/0063972 A1 Mar. 17, 2011

Related U.S. Application Data

(60) Provisional application No. 61/276,607, filed on Sep. 14, 2009.

(51) Int. Cl.
*H04L 12/28* (2006.01)
*H04L 12/24* (2006.01)

(52) U.S. Cl.
CPC .................................. *H04L 41/0659* (2013.01)
USPC ............................. 370/217; 370/225; 370/231

(58) Field of Classification Search
CPC ............ H04L 12/1863; H04L 12/5689; H04L 12/569; H04L 12/1877; H04L 12/2697; H04L 45/28; H04L 2012/5627; H04L 41/0659; H04L 41/0663; H04L 41/0668; H04L 41/0672; H04L 41/0836; H04L 41/0813; H04L 41/0816
USPC ........... 370/217, 222, 224, 225, 244; 709/238
See application file for complete search history.

(56) References Cited

U.S. PATENT DOCUMENTS

| | | | |
|---|---|---|---|
| 2003/0112749 A1* | 6/2003 | Hassink et al. | 370/225 |
| 2006/0221975 A1* | 10/2006 | Lo et al. | 370/395.5 |
| 2007/0183317 A1 | 8/2007 | Vasseur et al. | |
| 2008/0267078 A1* | 10/2008 | Farinacci et al. | 370/244 |
| 2009/0201803 A1* | 8/2009 | Filsfils et al. | 370/222 |
| 2010/0189113 A1* | 7/2010 | Csaszar et al. | 370/400 |
| 2012/0044801 A1* | 2/2012 | Vasseur et al. | 370/217 |

FOREIGN PATENT DOCUMENTS

WO WO-2009018113 A1 2/2009

OTHER PUBLICATIONS

International Search Report dated Nov. 19, 2010 for corresponding Application No. PCT/US2010/048189.
International Search Report dated Mar. 29, 2012 for corresponding Application No. PCT/US2010/048189.
P. Pan, et al. "Fast Reroute Extensions to RSVP-TE for LSP Tunnels." May 2005. 39 pages.

(Continued)

*Primary Examiner* — Awet Haile
(74) *Attorney, Agent, or Firm* — Harness, Dickey & Pierce, P.L.C.

(57) ABSTRACT

Provided is a method for avoiding traffic duplication in a point to multi-point network, the method including monitoring a status of first interconnection links in a first data path from a source to a destination, the first data path including an ingress node, an egress node, and one or more intermediate nodes. The method further includes establishing a second data path if a link of the first interconnecting links is determined to be an inoperable link, the second data path including the ingress node, the egress node, at least one of the one or more intermediate nodes and second interconnecting links, the second interconnecting links including new interconnecting links and a subset of the first interconnecting links, the subset not including the inoperable link in the first interconnecting links.

20 Claims, 6 Drawing Sheets

(56) References Cited

OTHER PUBLICATIONS

D. Awduche, et al. "RSVP-TE: Extensions for RSVP for LSP Tunnels." Dec. 2001. 62 pages.

E. Rosen, et al. "Multiprotocol Label Switching Architecture." Jan. 2001. 57 pages.

R. Aggarwal, et al. "Extensions to Resource Reservation Protocol—Traffic Engineering (RSVP-TE) for Point-to-Multipoint TE Label Switched Paths (LSPs)." May 2007. 54 pages.

Office Action for Korean Application No. 10-2010-7006516 dated Jun. 3, 2013 and English translation thereof.

PIL Standardization WG, "PIL Fault Recovery Specification Document Version 2," Photonic Internet Lab., Apr. 14, 2008, pp. 1, 20, 21 and 65, http://www.pilab.jp/index_j.html.

Office Action for Japnaese Application No. 2012-529801 dated Aug. 27, 2013 and English translation thereof.

Chinese Office Action dated Jan. 6, 2014 for related Chinese Application No. 201080040767.7.

\* cited by examiner

DUPLICATE TRAFFIC AVOIDANCE IN A POINT TO MULTI-POINT NETWORK

PRIORITY STATEMENT

This application claims priority under 35 U.S.C. §119(e) to U.S. Provisional Patent Application No. 61/276,607, filed on Sep. 14, 2009, in the United States Patent and Trademark Office (U.S.P.T.O.), the entire contents of which is hereby incorporated herein by reference.

BACKGROUND OF THE INVENTION

Embodiments relate to avoiding traffic duplication in a point to multi-point network. Traffic duplication occurs in data paths downstream of a node where two paths including the same information stream, for example a video stream, merge. Example embodiments provide a method and apparatus for avoiding this traffic duplication.

SUMMARY OF THE INVENTION

One embodiment includes a method for avoiding traffic duplication in a point to multi-point network. The method includes dropping first data packets associated with a first data path until a second data path is de-activated. The second data path has associated second data packets, and the first data packets and the second data packets include the same data.

One embodiment includes a method for avoiding traffic duplication in a point to multi-point network. The method includes monitoring a status of first interconnection links in a first data path from a source to a destination. The first data path includes an ingress node, an egress node, and one or more intermediate nodes.

The method further includes establishing a second data path if a link of the first interconnecting links is determined to be an inoperable link. The second data path includes the ingress node, the egress node, at least one of the one or more intermediate nodes and second interconnecting links. The second interconnecting links include new interconnecting links and a subset of the first interconnecting links. The subset does not include the inoperable link in the first interconnecting links.

The method further includes activating the second data path, monitoring the status of the inoperable link and establishing a third data path if the inoperable link becomes operable. The third data path includes the ingress node, the egress node, the one or more intermediate nodes and the first interconnecting links. The method further includes activating the third data path and dropping data packets associated with the third data path at one of the one or more intermediate nodes until the second data path is de-activated and lastly de-activating the second data path.

A network node includes at least one ingress port configured to receive packets and at least one egress port configured to transmit packets. The network node further includes a processor configured to receive first signaling packets and determine if the first signaling packets indicate an interconnecting link associated with a first data path is inoperable. The processor further receives first data packets via a second data path bypassing the interconnecting link if the interconnecting link is inoperable and receives second signaling packets.

The processor determines if the second signaling packets indicate the interconnecting link is operable. The processor determines if the second signaling packets are associated with the same information as the first signaling packets. The processor determines if the second signaling packets are associated with a third data path. The processor drops the second data packets, the second data packets being data packets associated with the second signaling packets, until the second data path is de-activated if the second signaling packets are associated with the same information as the first signaling packets and the second signaling packets are associated with the third data path. The processor determines if the second data path is de-activated and transmits the second data packets associated with the second signaling packets if the second data path is de-activated.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
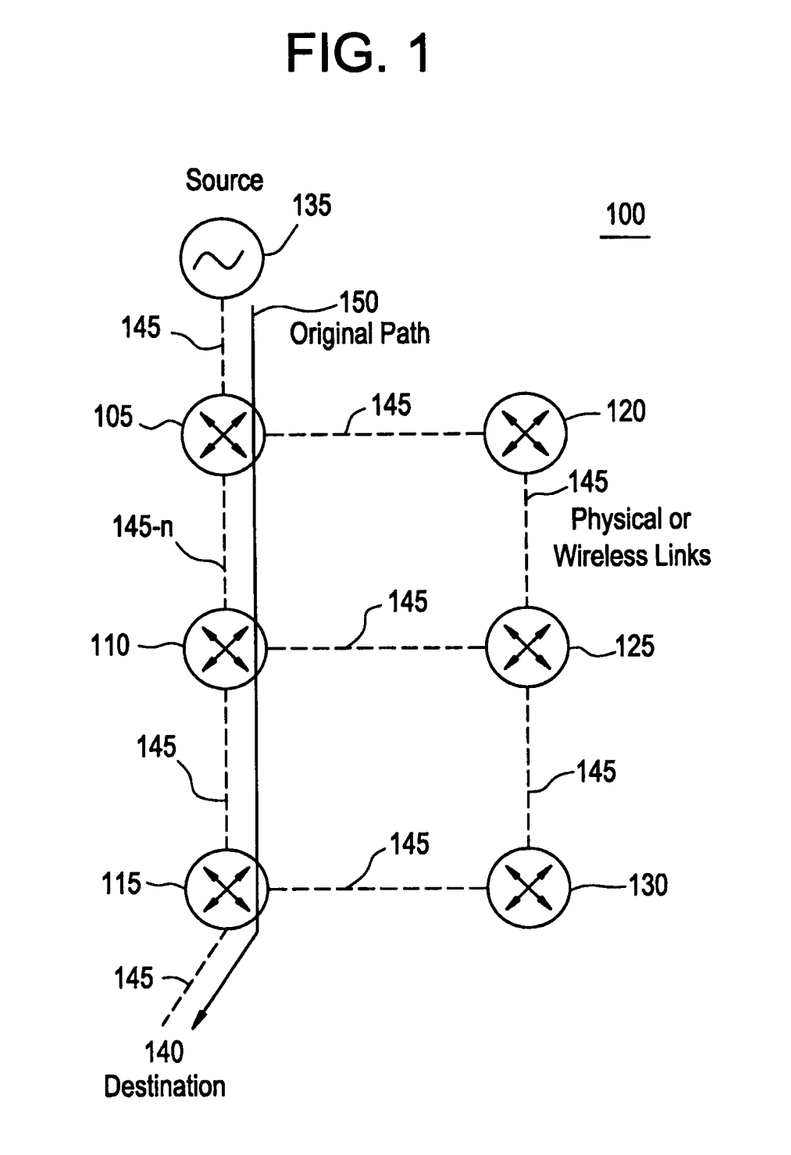
FIG. 1 illustrates a point to multi-point network including a data path according to an example embodiment.

FIG. 1 illustrates a point to multi-point network 100 according to an example embodiment. The point to multi-point network may include one or more ingress or root nodes 105, 120. The point to multi-point network may include one or more egress or leaf nodes 115, 130. The point to multi-point network may include one or more intermediate or branch nodes 110, 125. In addition, the point to multi-point network may include one or more interconnecting links 145 to interconnect one or more of the nodes.

A source 135 may be connected to one or more of the ingress or root nodes 105, 120 via an interconnecting link. A destination 140 may be connected to one or more of the egress or leaf nodes 115, 130 via an interconnecting link.

The point to multi-point network 100 may be a wired network, a wireless network, or a combination of both. The source 135 may be a video source (e.g., a television station or an on demand movie video stream). The destination 140 may be a user with a video display (e.g., a television or a hand held video device). A node 105, 110, 115, 120, 125, or 130 may be a router or a switch (e.g., a label switched router (LSR) or an ATM switch). An interconnecting link 145 may be wired (e.g., a coaxial link or a fiber link) or wireless.

The interconnecting link from the source 135 to the ingress or root node 105, 120 may be a direct link via, for example, an internet protocol layer 1 connection or a remote link via, for example, an internet protocol layer 3 routing. The interconnecting link from the destination 140 to the egress or leaf node 115, 130 may be a direct link via, for example, an internet protocol layer 1 connection or a remote link via, for example, an internet protocol layer 3 routing.

The point to multi-point network 100 may include one or more data paths, for example, an original data path 150. A data path includes an ingress or root node (e.g., node 105), an egress or leaf node (e.g., node 115), one or more intermediate or branch nodes (e.g., node 110) and one or more interconnecting links (e.g., link 145). A data path may be a virtual data path or a tunnel.

The point to multi-point network 100 may be a multi protocol label switching (MPLS) network as set forth in RFC 3031. A MPLS network is a network that directs and carries data from one network node (e.g., node 125) to the next. A network node may be known as a hop within the network. A MPLS network may allow for creation of virtual links between nodes. A MPLS network may encapsulate packets of various network protocols.

Data packets in a MPLS network may be assigned labels. Forwarding decisions may be made based on the contents of the labels without concern of the contents of the data packet. The data packets may include a MPLS header including one or more labels. The labels are then used to forward the data packet to the next node or hop. As is known in the art, the operation of nodes may vary based on whether the node is an ingress/egress node (e.g., nodes 105 or 115) or an intermediate node (e.g., node 110).

As is known in the art, a point to multi-point network (e.g., network 100) may use resource reservation protocol-traffic engineering (RSVP-TE), as set forth in RFC 3209, to define data paths. RSVP-TE may be used to establish MPLS label switched paths (LSP) taking into consideration network constraint parameters (e.g., bandwidth, packet loss ratio and maximum packet transfer delay) and explicit route requirements.

As is known, RFC 3209 define a session object including information fields to uniquely define a traffic engineered tunnel and a plurality of session objects may exist in any RSVP-TE session. The session objects relevant to example embodiments will be discussed. For example, as is known, the RSVP-TE session objects may include an LSP_TUNNEL SESSION object, a SENDER_TEMPLATE object, a FILTER_SPEC object and an EXPLICIT_ROUTE object (ERO). Further, a shared session object may be any session object shared amongst one or more LSP tunnels including one or more shared links.

The LSP_TUNNEL SESSION object is used to narrow the scope of the RSVP-TE session to the particular TE tunnel in question. The SENDER_TEMPLATE object and the FILTER_SPEC object carry an LSP ID; the LSP ID being a tunnel identifier. An RSVP-TE session may also include a LABEL_REQUEST object. As is known, the LABEL_REQUEST object may include a RSVP Resv message. The RSVP Resv message allocates labels to downstream nodes and propagates the labels to upstream nodes.

The EXPLICIT_ROUTE object encapsulates a concatenation of hops which constitutes the explicitly routed path. Using the EXPLICIT_ROUTE object, the paths can be pre-determined, independent of conventional IP routing.

An explicit route is a data path that has each node or hop in the data path defined as the data path is established. For example, an explicit route is established by a node, typically an ingress node (e.g., node 105), sending a path message including information fields indicating the data path is an explicit route. As set forth in RFC 3209, the information fields may be associated with the EXPLICIT_ROUTE object. The contents of an EXPLICIT_ROUTE object are a series of variable length data fields called subobjects. Each subobject includes at least a list of nodes or hop addresses.

Figure 2:
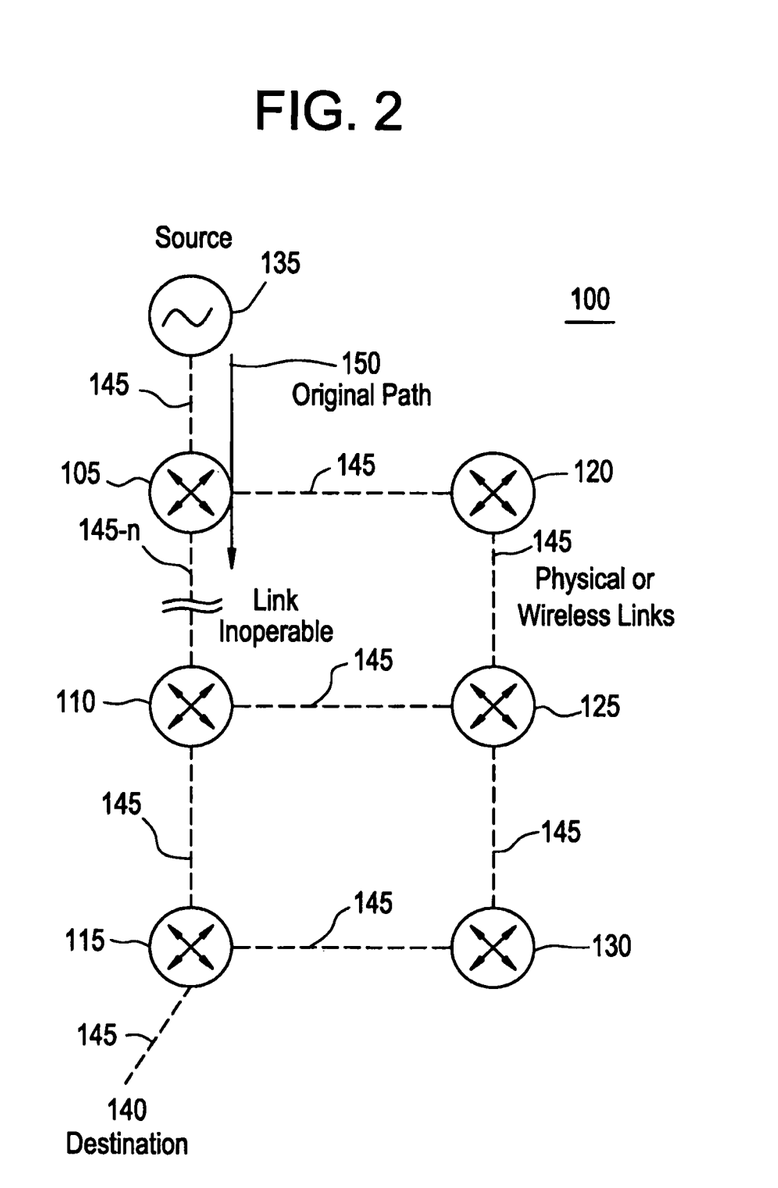
FIG. 2 illustrates a point to multi-point network including an inoperable link in a data path according to an example embodiment.

FIG. 2 illustrates the same point to multi-point network 100 as described with regard to FIG. 1. The one exception is that interconnecting link 145-n is an inoperable link. In example embodiments interconnecting link 145-n may become inoperable because of link-flapping. As is known in the art, link-flapping is when a link (or other component in a path) switches back and forth between operable and inoperable.

Figure 3:
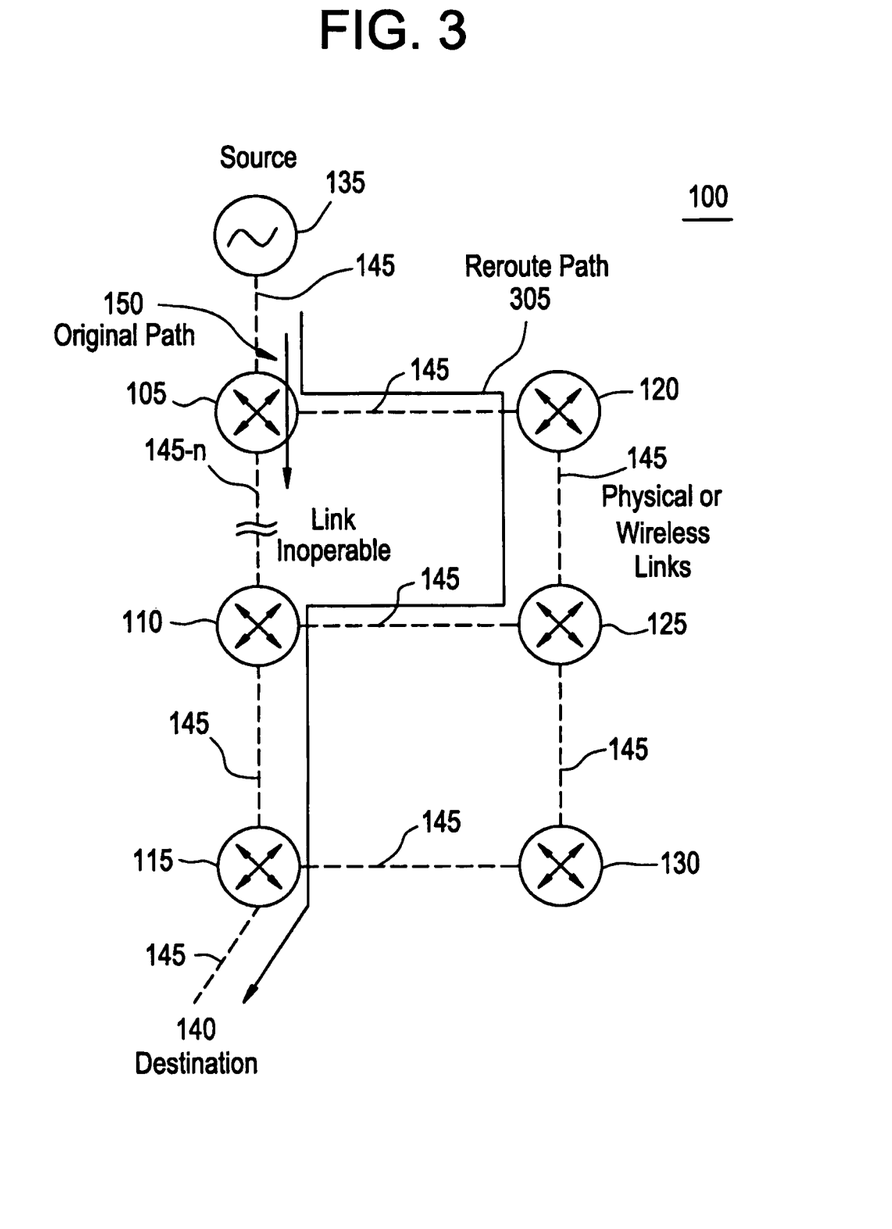
FIG. 3 illustrates a point to multi-point network including a rerouted data path according to an example embodiment.

FIG. 3 illustrates the same point to multi-point network 100 as described with regard to FIG. 3. The one exception is the addition of reroute path 305. Reroute path 305 reroutes the information associated with the source 135 around the inoperable link 145-n.

Figure 4:
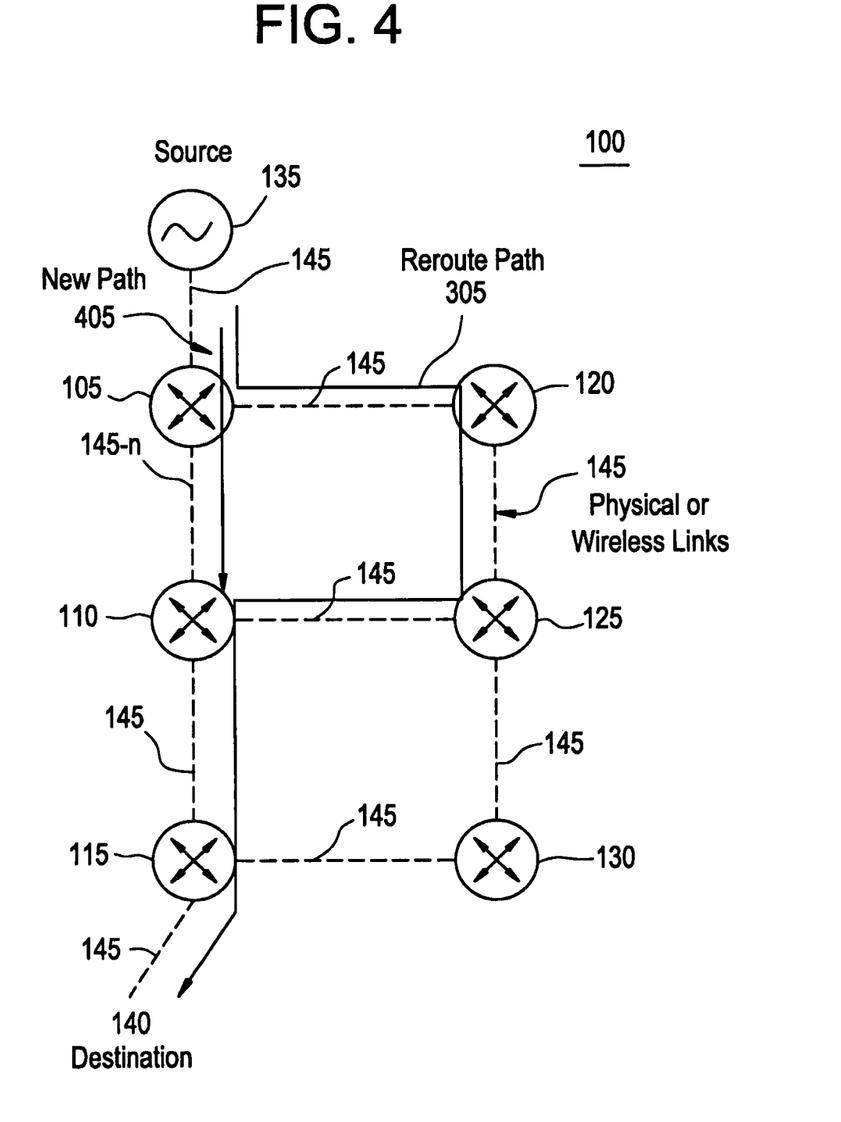
FIG. 4 illustrates a point to multi-point network including a rerouted data path and a repaired link according to an example embodiment.

FIG. 4 illustrates the same point to multi-point network 100 as described with regard to FIG. 3, with two exceptions. First, interconnecting link 145-n is now operable. Second, a new data path 405 has been established. The new data path 405 is similar to the original data path 150 except data packets are not transmitted past node 110 (known as a remerge node).

Figure 5:
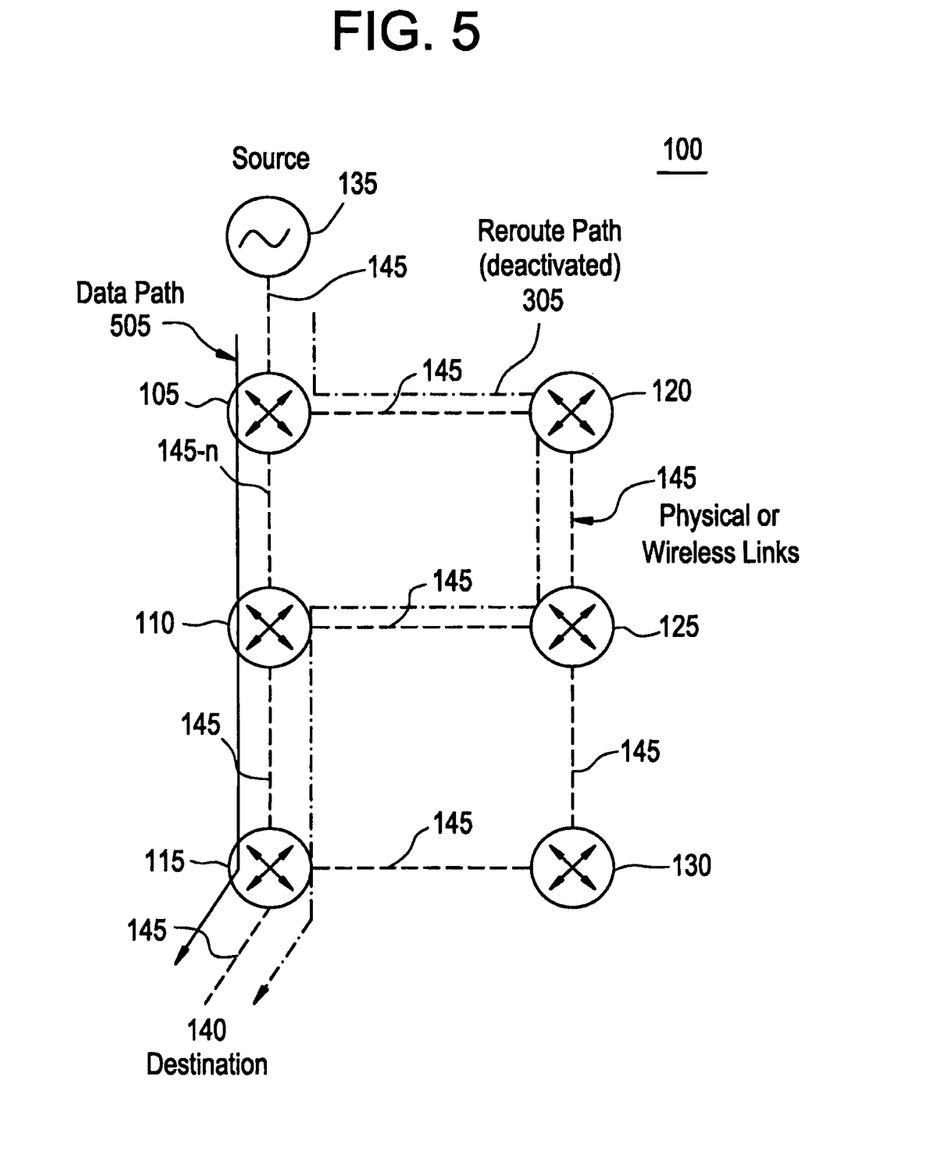
FIG. 5 illustrates a point to multi-point network including a data path and a de-activated rerouted data path according to an example embodiment.

FIG. 5 illustrates the same point to multi-point network 100 as described with regard to FIG. 4, with two exceptions. First, the reroute path 305 has been deactivated. Second, data packets associated with new path 405 are transmitted by node 110 and continue on to the destination 140.

Data packets associated with paths 150, 305 and 505 all include the same information associated with source 135.

Figure 6:
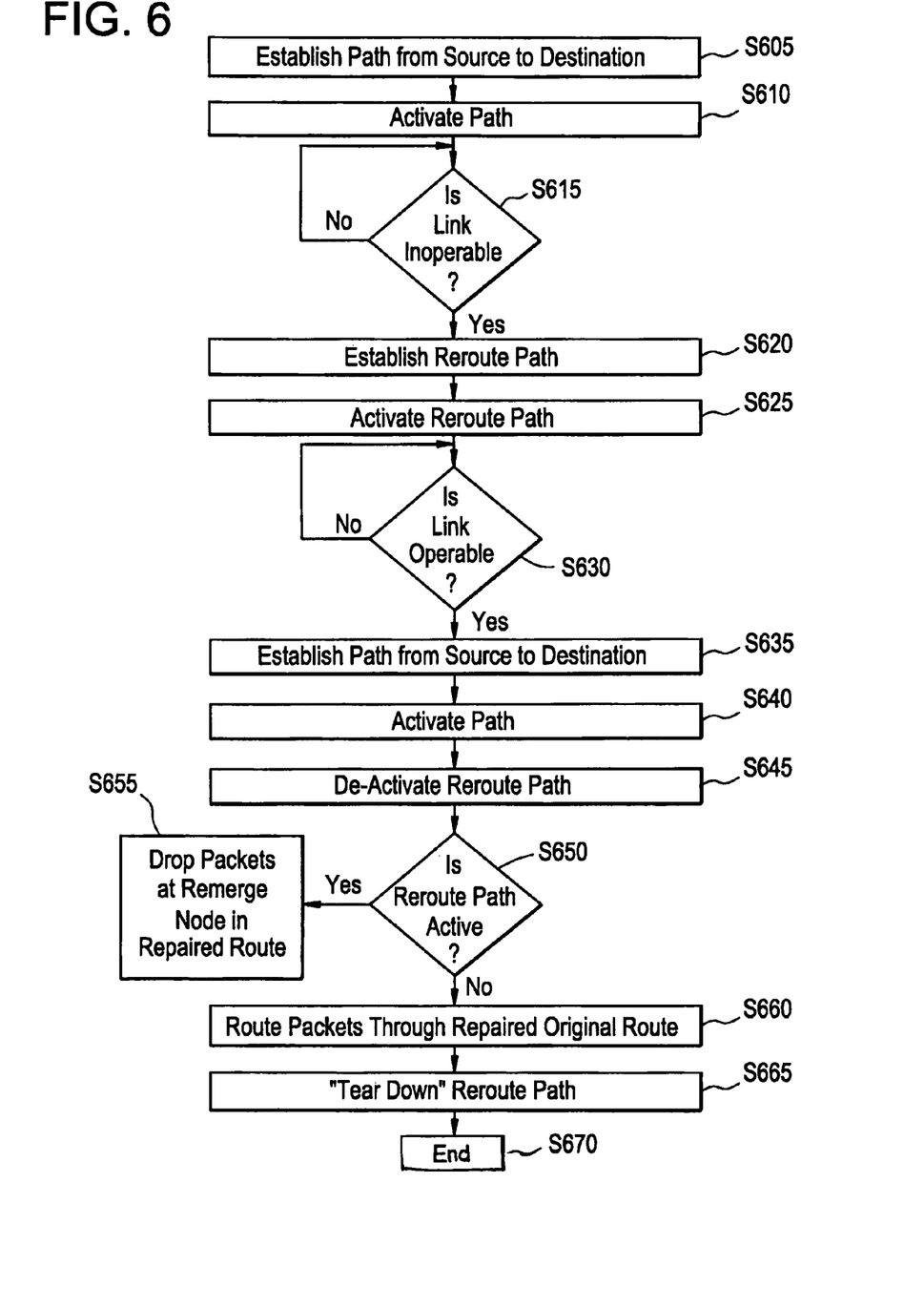
FIG. 6 illustrates a method for duplicate traffic avoidance according to an example embodiment.

FIG. 6 illustrates an example embodiment of a method for duplicate traffic avoidance according to an example embodiment. While describing the steps of the method associated with FIG. 6, the sequence of events associated with FIGS. 1-5 will be become more apparent.

In step S605 a data path may be established by, for example, the ingress node 105. For example, the data path may be the original data path as described above with regard to FIG. 1. The data path may be, for example, an explicit route data path as described above.

For example, as set forth in RFC 3209, a node receiving a path message containing an EXPLICIT_ROUTE object determines the next hop for this path. This is done because the next node in the list of nodes for the explicit route might be an IP subnet or an Autonomous System. Therefore, selection of this next hop may involve a decision from a set of feasible alternatives. To determine the next hop for the path, a node receiving the path message may perform at least the following steps:

The node receiving the path message first evaluates the first subobject. If the node is not one of the nodes in the list of nodes described by the first subobject, the node has received the path message in error and returns a "Bad initial subobject" error. If there is no first subobject, the message is also in error and the system returns a "Bad EXPLICIT_ROUTE object" error. If there are no errors, the node continues to evaluate the path message.

If there is no second subobject, this indicates whether the end of the explicit route (e.g., the node is the last node in list of nodes). Therefore, the EXPLICIT_ROUTE object may be removed from the Path message.

Assuming there is a second subobject, the node evaluates the second subobject. Assuming the node is one of the nodes in the list of nodes described by the second subobject, the node then deletes the first subobject and continues processing as above. Note that this makes the second subobject into the first subobject of the next iteration and allows the node to identify the next node in the list of nodes in the path of the path message after possible repeated application(s) of the above steps.

Assuming the node is not one of the nodes in the list of nodes described by the second subobject, the node then selects a next hop within the list of nodes of the first subobject (which the node belongs to) that is along the path to the next node of the list of nodes associated with the second subobject.

Finally, the node replaces the first subobject with any subobject that denotes a node of the list of nodes containing the next hop. This is done so that when the path message is received by the next hop, it will be accepted, and processed as described above.

The data path 150 may also be a protected data path. A protected data path is a data path that has a predefined reroute data path around all systems (e.g., a node or interconnecting link) in the protected data path. A data path may be, for example, a protected LSP data path. A data path is a protected LSP data path if, at a given hop, the hop has one or more associated backup tunnels originating at that hop.

For example, the hop from ingress node 105 to node 110 including interconnecting link 145-n may have an associated backup tunnel including node 120 and node 125 as well as other interconnecting links 145. The associated backup tunnel may be illustrated as, for example, reroute path 305 shown in FIG. 3 through FIG. 5. Reroute path 305 protects interconnecting link 145-n.

For example, as is known by those skilled in the art, RFC 4090 sets forth two protected LSP data paths. The first is a one-to-one backup and the second is a facility backup.

In the one-to-one backup method, a label-switched path (LSP) is established that intersects the original LSP somewhere downstream of the point of link or node failure. A separate backup LSP is established for each LSP that is backed up. When a failure occurs along a protected LSP, traffic is redirected onto a local detour.

The facility backup method takes advantage of the MPLS label stack. Instead of creating a separate LSP for every backed-up LSP, a single LSP is created that serves to back up a set of LSPs. Such an LSP tunnel may be called a bypass tunnel. The bypass tunnel must intersect the path of the original LSP(s) somewhere downstream of ingress node 105.

As is known, a path message may include information fields indicating the data path is to be a protected data path. For example, a SESSION_ATTRIBUTE object as set forth in RFC 4090 includes a plurality of information fields called session flags. The flags relevant to example embodiments may include the "local protection desired", the "label recording desired", the "node protection desired" and the "bandwidth protection desired" flags.

The "local protection desired" flag indicates whether permission for nodes to use a local repair mechanism that may result in violation of the explicit route object. The "label recording desired" flag indicates whether label information should be included in at least one of the subobjects of the path message. The "node protection desired" flag indicates whether the protected LSP has a backup path that provides protection against a failure of the next node along the protected LSP. The "bandwidth protection desired" flag indicates whether the protected LSP has a backup path that is guaranteed to provide a desired bandwidth.

To indicate that an LSP should be locally protected, ingress node 105, as the head-end node, may set the "local protection desired" flag in the SESSION_ATTRIBUTE object.

In step S610 the data path may be activated. Activating a data path is to cause a data path to start passing traffic. The establishment and activation of a data path are logically separate events. They may, however, be implemented or invoked as one atomic action.

In step S615 a node (e.g., ingress node 105) monitors each of the interconnecting links (e.g., links 145). The node may monitor messages and/or session state flags in messages that indicate the status of each node and/or each link along the data path (e.g., the explicit route). If one of the interconnection links (e.g., link 145-n) were to become inoperable as shown in FIG. 2, a reroute path 305 is established in step S620, otherwise the node continues to monitor the interconnecting links 145. In step S620, a reroute path (e.g., reroute path 305) is established. As described above, a reroute path protects a data flow in the event of a failure in a data path. As is known by those skilled in the art, a reroute path (e.g., reroute path 305) may be a fast reroute path. A fast reroute path is an unambiguous and uniquely identified backup path that is identified during the establishment of the path to be backed up (e.g., original path 150 established in step S605). A path message establishing the path to be backed up (e.g., original path 150) may include information fields indicating a request to establish a fast reroute path. For example, RFC 4090 sets forth a FAST_REROUTE object to include the information fields required to define a fast reroute path.

The FAST_REROUTE object is used to control the backup used for a protected LSP. As is known, the FAST_REROUTE object includes a plurality of session attributes and session flags. Those attributes and/or flags relevant to example embodiments will be discussed below. The FAST_REROUTE object also allows a specific local protection method to be requested. This object may only be inserted into the path message by the head-end node (e.g., ingress node 105) and may not be changed by downstream nodes.

As is known from RFC 4090, the FAST_REROUTE object includes a plurality of session flags. The flags relevant to example embodiments may include the "one-to-one backup desired" and the "facility backup desired" flags. The "one-to-one backup desired" flag indicates whether the protected LSP should be protected via the one-to-one backup method (as is discussed above). The "facility backup desired" indicates whether the protected LSP should be protected via the facility backup method (as is discussed above).

To select the one-to-one backup method for the protected LSP path, ingress node 105, as the head-end node, should include a FAST_REROUTE object in the path message and set the "one-to-one backup desired" flag.

To select the facility backup method for the protected LSP path, ingress node 105, as the head-end node, should include a FAST_REROUTE object in the path message and set the "facility backup desired" flag. The lack of a FAST_REROUTE object, or having both these flags cleared, may be treated by ingress node 105 as a lack of a preference as to the type of backup to use. If both flags are set, ingress node 105 may use either method or both.

As discussed above, to indicate that an LSP should be locally protected, ingress node 105, as the head-end node, may set the "local protection desired" flag in the SESSION_ATTRIBUTE object. Ingress node 105 may also include a FAST_REROUTE object in the path message or ingress node 105 may both set the "local protection desired" flag in the SESSION_ATTRIBUTE object and include a FAST_REROUTE object in the path message.

As described above, the inoperable interconnection link (e.g., link 145-n) may exhibit link-flapping behavior. If the inoperable interconnection link is exhibiting link-flapping behavior, prior art systems would repeatedly re-establish and re-activate the original (primary) data path (e.g., path 150) each time the inoperable interconnection link becomes operable.

By contrast, in step S625 ingress node 105, in example embodiments, activates the reroute path 305. Activating a data path is to cause a data path to start passing traffic. The establishment and activation of a data path are logically separate events. They may, however, be implemented or invoked as one atomic action.

Once ingress node 105 has decided to protect a LSP and has identified the path to use, ingress node 105 may signal for the detour (e.g., steps S630-S640). As will be understood by one skilled in the art, the decision to protect a LSP varies by system design criteria. Therefore, for clarity and brevity the decision will not be discussed further. The following describes the transformation to be performed upon the protected LSP's path message to create the detour LSP's path message. To transform a path message a node (e.g., ingress node 105) modifies fields in the path message to indicate a backup path is in use.

As is known, RFC 4090 sets forth two different methods to uniquely identify a backup path is in use. The first is the sender template-specific method and the second is the path-specific method.

If the sender template-specific method is to be used, then ingress node 105 changes an address of the SENDER_TEMPLATE (described above) to an address belonging to ingress node 105, the address may or may not be the same as the address used for the path message of the protected LSP. Additionally, a DETOUR object, which includes detour LSPs operating like regular LSPs, may be added to the path message.

If the path-specific method is to be used, then ingress node 105 adds a DETOUR object to the path message.

The SESSION_ATTRIBUTE flags (described above) "local protection desired", "bandwidth protection desired", and "node protection desired" are cleared. The "label recording desired" flag may be modified. If the protected LSP's path message contains a FAST_REROUTE object (described above), the FAST_REROUTE object is removed from the detour LSP's path message.

Ingress node 105 generates an EXPLICIT_ROUTE object (described above) toward the egress node (e.g., node 115). First, ingress node 105 removes all subobjects preceding the first address belonging to the Merge Point, which is a node where one or more backup tunnels rejoin the path of the protected LSP downstream of the potential failure. For example, as shown in FIG. 3, node 110 is a Merge Point. Then ingress node 105 adds subobjects corresponding to the backup path to use between ingress node 105 and the merge point.

The detour LSP uses the same reservation style as the protected LSP. This may be correctly reflected in the SESSION_ATTRIBUTE object of the path message.

Detour LSPs may operate like regular LSPs. Once a detour path is successfully computed and the detour LSP is established, ingress node 105, as the head-end node, need not compute detour routes again, unless for example the contents of the FAST_REROUTE object have changed or the node for a protected LSP has changed. Ingress node 105 may also recompute detour routes at any time.

In step S630 a node (e.g., ingress node 105) upstream of the inoperable interconnecting link (e.g., link 145-n) monitors the inoperable interconnecting link (e.g., link 145-n). For example, the node may monitor messages and/or session state flags that indicate the status of each node and/or each link along the data path (e.g., the explicit route). If the inoperable interconnecting link 145-n becomes operable, a new path (e.g., path 405) may be established, otherwise the monitoring continues.

In step S635, the ingress node 105 establishes a new path 405. Ingress node 105 may establish new path 405 as the result of a global revert. A global revert reverts a path in a network to a prior state by signaling for a new path over a previously established path and then activating the new path.

New path 405 may be established using the same method as discussed above with regard to step S605. New path 405 may also be established as a make-before-break data path. A make-before-break data path is a data path that is established and activated before deactivation of a data path the make-before-break is meant to replace. For example, as known by those skilled in the art, RFC 3209 describe a method for establishing a make-before-break data path.

In describing make-before-break traffic routing, reference to an established route and new route is made. The established route may be reroute path 305 and the new route may be new path 405. Although the make-before-break traffic routing method may provide a smooth transition and a reduced risk of traffic disruption, while both paths are active traffic may be duplicated which may be undesirable.

To support the make-before-break method, links that are common to the established LSP tunnel (e.g., reroute path 305) and new LSP tunnel (e.g., new path 405) and resources used by the established LSP tunnel should not be released before traffic is transitioned to the new LSP tunnel.

As discussed above, the LSP_TUNNEL SESSION object is used to narrow the scope of the resource reservation protocol (RSVP) session to the particular traffic engineering (TE) LSP tunnel in question. The combination of the destination IP address (an address of the node which is the egress of the tunnel, e.g., node 115), a Tunnel ID, and the tunnel ingress node's (e.g., ingress node 105) IP address uniquely identify a LSP tunnel.

During a reroute, the tunnel ingress (e.g., node 105) needs to appear as two different senders to the RSVP session. This is achieved by the inclusion of the "LSP ID", which, as discussed above, is carried in the SENDER_TEMPLATE and FILTER_SPEC objects.

To effect a reroute, the ingress node 105 picks a new LSP ID and forms a new SENDER_TEMPLATE. The ingress node 105 then creates a new EXPLICIT_ROUTE object (described above) to define the new path. Thereafter, the ingress node 105 sends a new path message using the original session object and the new SENDER_TEMPLATE and the new EXPLICIT_ROUTE object. The ingress node 105 continues to use the established path LSP and refresh the established path message.

On links that are not held in common, the new path message is treated as a conventional new LSP tunnel during setup. On links held in common, a shared session object allows the LSP to be established sharing resources with the established LSP tunnel. Once the ingress node 105 receives a Resv message (described above) for the new LSP tunnel, the ingress node can transition traffic to the new LSP tunnel by activating the new tunnel in step S640.

In step S640 the ingress node may activate the new path 405. Activating a data path is to cause a data path to start passing traffic. The establishment and activation of a data path are logically separate events. They may, however, be implemented or invoked as one atomic action. In step S645 ingress node 105 may deactivate the reroute path 305. Deactivating a data path is to cause a data path to stop passing traffic.

To determine if a data path, or LSP tunnel, is active or de-active, a node may examine one or more session objects for a traffic engineered (TE) tunnel. As is known, session objects may include one or more session object flags that indicate the status of a path or a route. For example, the LSP_TUNNEL SESSION object may include a "route active" flag. If the "route active" flag is set, the LSP tunnel is active.

As is known, RFC 4875 sets forth a procedure for a node in a point to multipoint network to distinguish between messages and/or data associated with a re-merge routing and messages and/or data associated with reroute. A "re-merge" may refer to the case where a node associated with a branch of a P2MP LSP is a re-merge branch that intersects the P2MP LSP at another node farther down the path. For example, node 110 may be a re-merge point. As is known, nodes associated with a make-before-break P2MP LSP may be different than that associated with the original P2MP LSP. However, the two P2MP LSPs will be treated as distinct (but related) LSPs because they will have different LSP ID field values in their SENDER_TEMPLATE objects.

According to example embodiments, in step S650 a node (e.g., node 110) determines whether the reroute path 305 has been deactivated. For example, node 110 may check the "route active" flag for the LSP tunnel associated with reroute path 305. If the reroute path 305 is active, in step S655, data packets associated with the new path 405 are dropped at node 110 (the remerge node). For example, referring to FIG. 4, if reroute path 305 is active, packets associated with new path 405 are dropped by node 110 (the remerge node).

For example, if path 150 failed because interconnecting link 145-n was exhibiting link-flapping behavior which interconnecting link 145-n is no longer exhibiting, new path 405 may be established as the result of a global revert, as described above. Because new path 405 was established as a result of a global revert, data duplication may be prevented by dropping packets associated with new path 405 if reroute path 305 is active.

If in step S650 a node (e.g., node 110) determines that the reroute path 305 is not active, the node (e.g., node 110) routes data packets associated with the new path 405 on to the destination 140. For example, referring to FIG. 5, if reroute path 305 is not active, packets associated with new path 405 are not dropped by node 110 and continue on to the destination 140.

In step S665 ingress node 105 may tear down the reroute path. As is known, to tear down a path is to remove the path associated with the RSVP-TE session (described above) as set forth in RFC 4090

As will be understood by one of ordinary skilled in the art, the above described example embodiments may be implemented as software code segments stored on a recordable medium and executed by a processor. The recordable medium and processor may be a memory and processor as functional components of, for example, a label switched router LSR.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for avoiding traffic duplication in a network that includes at least a first data path between a source and a destination, the method comprising:
   establishing a second data path between the source and the destination that temporarily replaces the first data path, if a link in the first data path becomes inoperable, the second data path not including the inoperable link;
   dropping, at one or more intermediate nodes that are between the source and the destination in both the first data path and the second data path, first data packets associated with the first data path until the second data path is de-activated, the second data path having associated second data packets, the first data packets and the second data packets including same data; and
   if the inoperable link becomes operable then,
   reestablishing the first data path between the source and the destination as a third data path, and
   deactivating the second data path such that data packets do not flow therethrough between the destination and the source.

2. The method of claim 1, wherein the first data path is a make-before-break data path as set forth in at least one of RFC 3209 and the second data path is a fast reroute data path as set forth in RFC 4090.

3. The method of claim 1, wherein the network is a multi-protocol label switching (MPLS) point to multi-point network including a plurality of nodes configured to use resource reservation protocol (RSVP) and traffic engineering (TE), the MPLS network being a network of virtual links between nodes configured to encapsulate packets of various protocols, RSVP being a transport layer protocol configured to reserve resources across a network for an integrated services internet and TE being an extension of RSVP and configured to consider network constraint parameters when reserving network resources.

4. The method of claim 3, wherein one or more paths formed in the MPLS network are label switched paths (LSP), the LSP being a path through the MPLS network setup by a signaling protocol.

5. The method of claim 4, wherein the second data path is identified by a same LSP path label as a LSP path label used to identify a third data path, the third data path being an original data path having third data packets including the same data.

6. The method of claim 5, wherein the first, second and third data packets are identified by a same LSP data label and each of the first, second and third data packets include the same data.

7. The method of claim 4, wherein the first data path is identified by a different LSP label as a LSP label used to identify the second data path.

8. A method for avoiding traffic duplication in a network, the method comprising:
   monitoring a status of first interconnection links in a first data path from a source to a destination, the first data path including an ingress node, an egress node, and one or more intermediate nodes between the source and the destination;
   establishing and activating a second data path between the ingress node and the egress node through at least one of the one or more intermediate nodes if a link of the interconnection links becomes an inoperable link, the second data path temporarily replacing the first data path and not including the inoperable link
   monitoring the inoperable link to determine if the inoperable link becomes operable; and
   if the inoperable link becomes operable then,
      establishing and activating a third data path, the third data path including the ingress node, the egress node, the one or more intermediate nodes and the interconnecting links,
      dropping, at the at least one of the one or more intermediate nodes, data packets associated with the third data path until the second data path is de-activated, and
      de-activating the second data path.

9. The method of claim 8, wherein the network is a multi-protocol label switching (MPLS) point to multi-point network including a plurality of nodes configured to use resource reservation protocol (RSVP) and traffic engineering (TE), the MPLS network being a network of virtual links between nodes configured to encapsulate packets of various protocols, RSVP being a transport layer protocol configured to reserve resources across a network for an integrated services internet and TE being an extension of RSVP and configured to consider network constraint parameters when reserving network resources.

10. The method of claim 9, wherein monitoring the status of the links comprises:
receiving an error message from an upstream node;
retrieving a path identification value, a path integrity value and a node branch listing from the error message; and
determining the status of the interconnection links based on the path identification value, the path integrity value and the node branch listing.

11. The method of claim 9, wherein one or more paths formed in the MPLS network are label switched paths (LSP), the LSP being a path through the MPLS network setup by a signaling protocol.

12. The method of claim 11, comprising:
establishing the first data path by creating the LSP including the source as a source node, the destination as a destination node and the one or more intermediate nodes;
activating the first data path; and
mapping the data packets onto the LSP by assigning a label to the data packets forming an LSP-Tunnel, the LSP-Tunnel being a configured connection between two nodes that uses MPLS to carry the packets.

13. The method of claim 12, comprising:
including a fast reroute object in a path message of the first data path in order to indicate the first data path as a protected data path;
configuring a plurality of detour LSP paths around each of the plurality of nodes; and
creating an association between each of the plurality of nodes and a different detour LSP path of the plurality of detour LSP paths.

14. The method of claim 13, wherein establishing the second data path includes,
determining, by an upstream node, that a downstream link has failed;
rerouting the data packets using an associated detour LSP path; and
merging the data packets at a downstream node of the first data path such that the first data path and the second data path are a same data path after the merging of the data packets.

15. The method of claim 14, wherein the rerouted data packets are identified by a same label as the label used to identify the data packets in the data path.

16. The method of claim 10, wherein establishing the third data path includes,
creating, by the ingress node, a new label to identify a new LSP path,
creating, by the ingress node, the new LSP path, and
sending, by the ingress node, a new path message including information associating traffic on the new LSP path with traffic on the data path.

17. The method of claim 16, wherein
the at least one of the one or more intermediate nodes is a remerge node, and
the remerge node uses information received in the new path message to determine if the data packets should be dropped.

18. The method of claim 10, wherein
the second data path has a same LSP path label as the first data path, and
the third data path has a different LSP path label as the first data path.

19. A network node configured to perform as an intermediate node between a source and a destination in both a first data path and a second data path in a network, the network node comprising:
at least one ingress port configured to receive packets;
at least one egress port configured to transmit packets; and
a processor configured to,
receive, via the first data path, first signaling packets, the first signaling packets having associated first data packets;
determine if the first signaling packets indicate an interconnecting link associated with the first data path is inoperable;
receive, via the second data path, second data packets if the interconnecting link is inoperable, the second data path bypassing the interconnecting link;
receive second signaling packets;
determine if the second signaling packets indicate the interconnecting link is operable; and
if the interconnecting link becomes operable then,
determine if the second signaling packets include a same information as the first signaling packets,
determine if the second signaling packets are associated with a third data path between the source and the destination over the interconnecting link,
drop, at the intermediate node, the second data packets associated with the second signaling packets until the second data path is de-activated, if the second signaling packets include the same information as the first signaling packets and the second signaling packets are associated with the third data path,
de-activate the second data path such that the second data packets do not flow therethrough between the source and the destination, and
transmit, via the third data path, the second data packets associated with the second signaling packets, if the second data path is deactivated.

20. A network node configured to perform as an intermediate node between an ingress node and an egress node in both a first data path and a second data path between a source and a destination in a network, the network node comprising:
at least one ingress port connected to the ingress node;
at least one egress port connected to the egress node; and
a processor configured to,
establish the second data path between the source and the destination that temporarily replaces the first data path, if a link in the first data path becomes inoperable, the second data path not including the inoperable link,
drop, at the intermediate node, first data packets associated with the first data path until the second data path is de-activated, the second data path having associated second data packets, the first data packets and the second data packets including same data, and
if the inoperable link becomes operable then,
reestablish the first data path between the source and the destination as a third data path, and
deactivate the second data path such that data packets do not flow therethrough between the source and the destination.

* * * * *